United States Patent
Schüler et al.

(10) Patent No.: US 7,544,143 B2
(45) Date of Patent: *Jun. 9, 2009

(54) DRIVE UNIT OF AN ADJUSTER IN A VEHICLE

(75) Inventors: Rolf Schüler, Heiligenhaus (DE); Michael Berres, Leverkusen (DE); Bernd Bossmanns, Erkrath (DE); Karsten Kalmus, Bochum (DE); Christoph Schuhn, Düsseldorf (DE); Heinz Voss, Leverkusen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 141 days.

This patent is subject to a terminal disclaimer.

(21) Appl. No.: 11/581,090

(22) Filed: Oct. 13, 2006

(65) Prior Publication Data
US 2007/0060433 A1 Mar. 15, 2007

Related U.S. Application Data

(63) Continuation of application No. PCT/DE2005/000633, filed on Apr. 5, 2005.

(30) Foreign Application Priority Data
Apr. 15, 2004 (DE) .................. 10 2004 019 469

(51) Int. Cl.
F16H 48/30 (2006.01)
(52) U.S. Cl. .................. 475/150; 475/168; 475/169; 475/182; 475/183; 475/185

(58) Field of Classification Search ............ 475/149, 475/150, 162, 168, 169, 170, 182, 183, 185; 310/75 R, 98, 99, 112, 113, 114, 266
See application file for complete search history.

(56) References Cited

U.S. PATENT DOCUMENTS

| 1,463,638 | A | 7/1923 | Thallmayer |
| 2,864,017 | A | 12/1958 | Waltscheff |
| 4,367,424 | A | 1/1983 | Presley |
| 4,375,047 | A | 2/1983 | Nelson et al. |
| 4,918,344 | A | 4/1990 | Chikamori et al. |

(Continued)

FOREIGN PATENT DOCUMENTS

DE 31 29 672 C1 10/1982

(Continued)

OTHER PUBLICATIONS

U.S. Appl. No. 11/580,822, filed Oct. 13, 2006; In re: Rolf Schüler et al., entitled *Adjuster for a Vehicle Seat*.

(Continued)

*Primary Examiner*—David D. Le
(74) *Attorney, Agent, or Firm*—Womble Carlyle Sandridge & Rice, PLLC

(57) ABSTRACT

In a drive unit (10) of an adjuster (80) in a vehicle, having at least one particularly electronically commutated motor (12) and at least one gear stage (14) provided on the output side of the motor (12), the gear stage (14) is designed as a differential gear, which by making use of two different speeds and/or directions of rotation causes a movement of an output (54) around an axis (A).

24 Claims, 6 Drawing Sheets

U.S. PATENT DOCUMENTS

| | | | |
|---|---|---|---|
| 5,127,286 A | | 7/1992 | Wittig |
| 5,199,764 A | | 4/1993 | Robinson |
| 5,334,898 A | | 8/1994 | Skybyk |
| 5,586,833 A | | 12/1996 | Vossmann et al. |
| 5,876,298 A | * | 3/1999 | Kato et al. .................. 475/162 |
| 6,049,152 A | | 4/2000 | Nakano |
| 6,097,122 A | | 8/2000 | Bock |
| 6,099,430 A | | 8/2000 | Winks |
| 6,297,575 B1 | | 10/2001 | Yang |
| 6,331,034 B1 | | 12/2001 | Specht |
| 6,340,856 B1 | | 1/2002 | Schiller |
| 6,364,414 B1 | | 4/2002 | Specht |
| 6,373,160 B1 | | 4/2002 | Schrödl |
| 6,439,494 B1 | | 8/2002 | Specht et al. |
| 6,515,399 B1 | | 2/2003 | Lauf et al. |
| 6,547,332 B2 | | 4/2003 | Pejathaya |
| 6,715,832 B2 | | 4/2004 | Dill |
| 6,805,650 B2 | | 10/2004 | Branov et al. |
| 6,998,757 B2 | | 2/2006 | Seguchi et al. |
| 7,090,299 B2 | | 8/2006 | Lange |
| 7,105,964 B2 | * | 9/2006 | Miyazaki et al. .......... 310/75 R |
| 7,152,922 B2 | | 12/2006 | Garland |
| 7,243,994 B2 | | 7/2007 | Cha |
| 7,294,081 B2 | | 11/2007 | Schüler et al. |
| 7,326,143 B2 | * | 2/2008 | Kimura et al. .............. 475/162 |
| 7,329,200 B2 | | 2/2008 | Schüler et al. |
| 7,345,390 B2 | | 3/2008 | Schüler et al. |
| 2001/0011854 A1 | | 8/2001 | Heyden et al. |
| 2002/0021038 A1 | | 2/2002 | Lein et al. |
| 2004/0004384 A1 | | 1/2004 | Iwata et al. |
| 2005/0035678 A1 | | 2/2005 | Ward et al. |
| 2005/0121987 A1 | | 6/2005 | Ritzinger et al. |
| 2007/0029893 A1 | | 2/2007 | Schüler et al. |

FOREIGN PATENT DOCUMENTS

| | | |
|---|---|---|
| DE | 32 33 472 A1 | 3/1984 |
| DE | 33 01 139 A1 | 7/1984 |
| DE | 38 26 142 A1 | 2/1989 |
| DE | 43 25 391 A1 | 2/1995 |
| DE | 43 41 112 C1 | 6/1995 |
| DE | 44 25 193 C1 | 11/1995 |
| DE | 196 42 665 A1 | 4/1998 |
| DE | 197 09 852 A1 | 9/1998 |
| DE | 197 34 536 A1 | 2/1999 |
| DE | 197 37 269 A1 | 3/1999 |
| DE | 197 37 702 A1 | 4/1999 |
| DE | 197 46 595 A1 | 7/1999 |
| DE | 199 62 225 A1 | 6/2001 |
| DE | 100 02 485 A1 | 8/2001 |
| DE | 101 63 321 C1 | 8/2003 |
| DE | 103 21 712 A1 | 1/2004 |
| EP | 0 429 308 A1 | 5/1991 |
| EP | 0 647 542 B2 | 4/1995 |
| EP | 0 757 426 B1 | 2/1997 |
| EP | 0 760 549 A1 | 3/1997 |
| EP | 1 096 648 A2 | 5/2001 |
| EP | 1 110 804 A1 | 6/2001 |
| EP | 1 279 545 A2 | 1/2003 |
| FR | 2 567 462 A1 | 1/1986 |
| FR | 2 829 813 A1 | 3/2003 |
| GB | 601 519 A | 5/1948 |
| GB | 879 040 A | 10/1961 |
| GB | 2 126 798 A | 3/1984 |
| GB | 2 383 101 A | 6/2003 |
| JP | 90-46969 | 2/1997 |
| JP | 2001-314068 A | 11/2001 |
| WO | WO 95/15448 | 6/1995 |
| WO | WO 99/39426 | 8/1999 |

OTHER PUBLICATIONS

U.S. Appl. No. 11/580,821, filed Oct. 13, 2006; In re: Rolf Schüler et al., entitled *Drive Unit of an Adjuster of a Vehicle Seat*.

U.S. Appl. No. 11/581,040, filed Oct. 13, 2006; In re: Rolf Schüler et al., entitled *Drive Unit of an Adjuster of a Vehicle Seat*.

U.S. Appl. No. 11/581,108, filed Oct. 13, 2006; In re: Rolf Schüler et al., entitled *Drive Unit for a Vehicle Seat*.

Final Office Action mailed Nov. 14, 2008 for U.S. Appl. No. 11/580,822; In re: Schüler et al., entitled Adjuster for a Vehicle Seat.

* cited by examiner

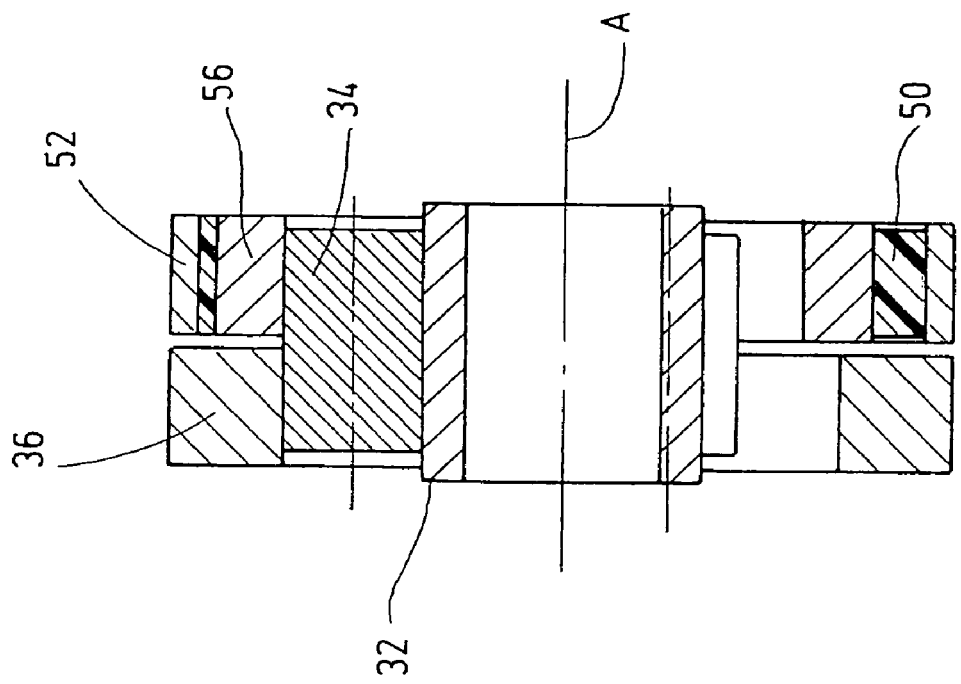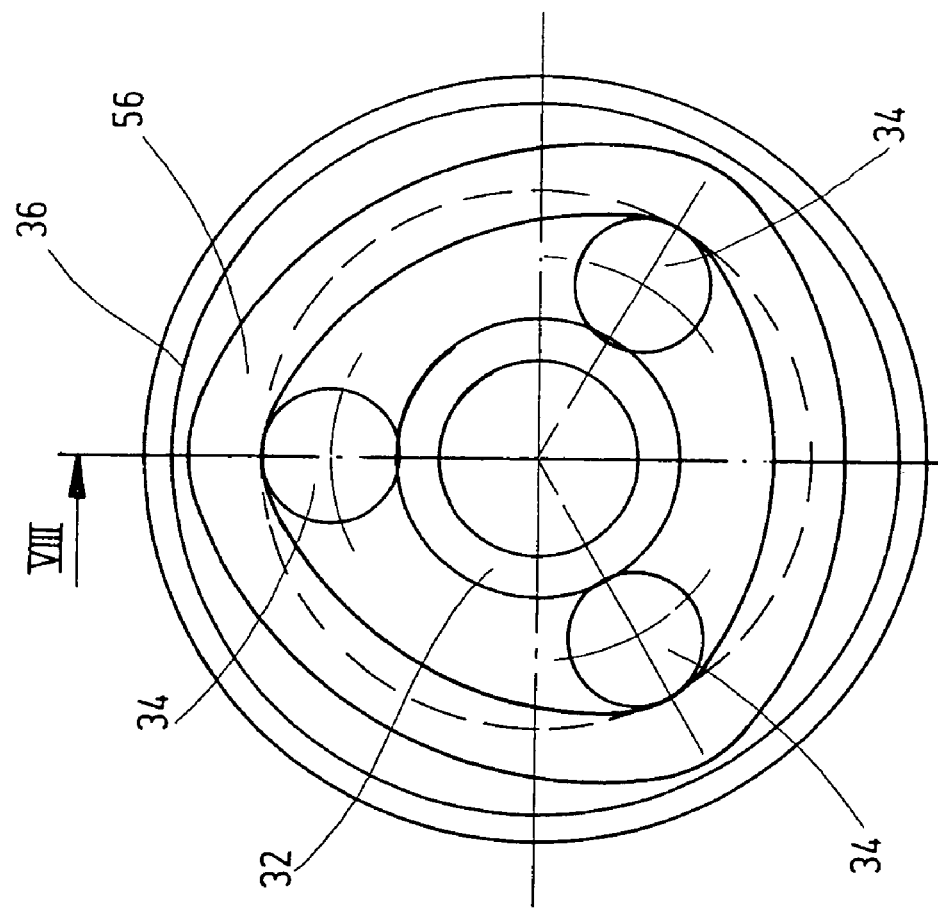

DRIVE UNIT OF AN ADJUSTER IN A VEHICLE

CROSS-REFERENCE TO RELATED APPLICATION

The present application is a continuation of International Application PCT/DE2005/000633, which was filed Apr. 5, 2005. The entire disclosure of PCT/DE2005/000633 is incorporated herein by reference.

BACKGROUND OF THE INVENTION

The invention relates to drive unit of an adjuster for a vehicle, including a motor and a gear stage provided on the output side of the motor.

Such drive units can be used for numerous applications, for example for window lifters, outside mirror adjusters, sliding roofs, or the like. For the used drive units, both brush-commutated and also electronically commutated motors are state of the art. By means of the gear stage, the speed of rotation can be reduced and at the same time the torque delivered can be increased.

BRIEF SUMMARY OF SOME ASPECTS OF THE INVENTION

An aspect of the present invention is the provision of improvements to a drive unit of the type described above. In accordance with one aspect of the present invention, a drive unit of an adjuster for a vehicle comprises a motor and a gear stage provided on the output side of the motor, with the gear stage being a differential gear. By making use of two different speeds and/or directions of rotation, the differential gear causes a movement of an output around an axis. The differential gear is a friction-wheel type of gear stage with hollow and/or solid rollers.

Designing the gear stage as a differential gear, which by making use of two different speeds and/or directions of rotation causes a movement of an output around an axis, makes it possible to generate particularly small relative movements which permit a low speed of rotation at the output. The two different speeds and/or directions of rotation can be input into the gear stage by the motor or can be generated by the gear stage itself and, by locking one component with such a speed of rotation, can be picked off as output at the other component. The gear stage may be designed to be in a friction wheel configuration with hollow and/or solid rollers, which is simple to manufacture, and using hollow rollers reduces the weight. The gear stage can also form the bearing for the rotor of the motor.

The gear stage is preferably connected to a electronically commutated motor, but it may also be connected to a brush-commutated motor.

Electronically commutated, brushless motors offer a high degree of electromechanical efficiency while at the same time taking up little space and generating very little noise. Several motors can be synchronized with each other with respect to the speed of rotation or position using the associated electronic systems without incurring any significant extra effort. The method of commutation offers the possibility of detecting a blocking state, of electrically defining a maximum permissible blocking force, and of monitoring temperature, and thus of achieving a higher energy density of the electromagnetic converter compared with brush motors, and this permits a significant reduction in installation space and weight. The integration of the control electronics into the motor offers advantages in recognizing blocking situations, evaluating existing sensors and achieving harmonization between the electronic function and the device being driven, for example when recording or programming parameters of the motor function.

Using two rotors rotating at different speeds of rotation and/or in different directions it is possible to generate a relative motion that is low compared with an absolute value for the speed of rotation and can be further reduced by the gear stage in order to increase the torque on the output side. The different speed of rotation and/or the different direction of rotation of the rotors is achieved in a simple manner in design terms, preferably by ensuring that amongst themselves the rotors have a different number of poles, which in turn is preferably different from the number of stator poles, so that the speed of rotation of the rotors also deviates from the speed of rotation of the magnetic field of the stator.

A ratio of the stator poles to the poles of the rotor that is different from 2:3 and 3:2 permits differences in the speed and/or direction of rotation, as a result of which—for example when using two rotors—a small relative movement can be generated, which leads to a reduction in the speed of rotation while at the same time the output torque is increased.

In order to ensure low-noise or silent running of the motor, with low friction, low heat generation and low energy consumption, the stator is preferably electronically commutated, while the rotors preferably carry permanent magnets as poles. In the circumferential direction of the stator exactly every second stator pole preferably carries a coil in order to complete the magnetic flux circuit over the adjacent stator pole. The stator and rotors can be arranged in radial sequence or axial sequence (disc armature) with respect to the central axis. In order to generate the different speeds of rotation, the poles of the stator and the rotors may differ, for example, by two. In particular, using permanent magnets made of metals taken from the rare earth group, the type of winding, which also yields a relatively large torque even at low current, and the combination of the ratios of the numbers of poles in each case contribute to a further reduction in the amount of installation space required.

In order to block a torque force introduced by the output side it is possible, for example, to provide for the motor to drive an intermediate gear via a motor pinion, and the intermediate gear can be positively or frictionally blocked.

Preferably several motors are combined to form a multimotor that can meet various performance requirements, depending on the situation, and at the same time is compact and ergonomically advantageous. For example, the motors are arranged in a structurally simple way in parallel slots of a common motor carrier, with one common intermediate gear wheel forming the output of the multimotor. The possibility of modular power definition also enables extremely high power outputs to be called up for short periods of time. While, for example, the motors of the multimotor are normally connected in series, they may also be connected in parallel in a special situation, in order to deliver a higher performance on the basis of the higher voltage. Such a situation could be, for example, a crash or an imminent crash of a vehicle.

The motor is preferably selectable from several motor variants, for example in the radial configuration an inner-rotor, an outer-rotor or a double-rotor motor. In combination with a gear stage that can be selected from several types of gear stages, whereby it is also possible to connect several gear stages one behind the other, a modular system is available that, with just a few modules, creates a large number of drive units to meet the various requirements.

In addition to the electromechanical efficiency of the motor, the efficiency of the gear stage is also important for the overall efficiency of the drive unit, which is why preference is given to coaxial, fully symmetrical gear constructions having the smallest possible number of individual bearings, in particular in the friction wheel configuration, without any additional bearings, and instead having their own bearing function.

The gear stage may be designed as a single-stage planetary differential gear having a sun gear, a set of planet rollers or gears and a hollow gear, with the sun gear and the hollow gear each being rotationally fixedly connected to a rotor in the motor, while a planetary carrier bearing the planet rollers or gears serves as the output.

The gear stage can also, however, be designed as a multi-stage (i.e. at least two-stage) planetary differential gear having one or more sun gears, one or more sets of inner planet rollers, one or more sets of outer planet rollers and one or more outer rings, arranged concentrically to the central axis, with the sun gears or the outer rings being axially adjacently arranged with respect to the axis. Different outer diameters of the two sun gears or different inner diameters of the two outer rings (or respectively different elasticities) result in slight differences in the speed of rotation.

The gear stage can also be designed as a single-stage planetary differential gear having one or more sun gears, a set of preferably unstepped planet rollers and one or more hollow gears, arranged concentrically to the central axis, with the sun gears or hollow gears being axially adjacently arranged with respect to the axis. Different elasticities and different outer diameters of the two sun gears or different inner diameters of the two hollow gears result in slight differences in the speeds of rotation.

The differences in the speed of rotation can be picked off, for example, if one of the two adjacent gear elements having different diameters is attached to the housing and one of them is connected with the output. In the configuration having two outer rings, the one that is attached to the housing is connected to the stator, while the sun gear, which acts as the drive element, is rotationally fixedly connected to a rotor in the motor.

In order, on the one hand, to apply pretension to hold together and center the gear stage, and, on the other hand, to compensate for tolerances, the hollow gear or the outer ring preferably possess an elastic metal ring and an elastomer bed in which the metal ring is set. A support that accepts the elastomer bed together with the metal ring and secures them axially is preferably joined to a bell-shaped part of the output which is designed as a hollow shaft.

The direction of rotation of the output can be alternatively selected by means of a switch gear without having to change the direction of rotation of the motor. This considerably simplifies the electronics needed for the motor. Switching is accomplished in an easy-to-manufacture design by providing preferably an electromagnet defined by a switching coil. The electromagnet interacts with two mutually repulsing permanent holding magnets which are coupled geometrically with two adjacent, similar gear elements in order to lock these by frictional or positive means. Using a switch gear it is also possible to select between two different gear ratios.

The gear stage can preferably be selected from several types of gear stage. In combination with a motor selectable from several motor variants, a modular system is available that creates a large number of drive units using just a few modules in order to meet the various requirements.

The drive unit preferably drives an adjuster within the vehicle seat. Thereby, the drive unit is preferably integrated into the load-bearing gear of the adjuster, wherein the load-bearing gear preferably directly bears a rotor. The adjuster designed like this has the advantage that separate transmission elements, for example a low-efficiency worm gear or the like, as well as separate bearing elements for the rotor, are not needed between the drive unit and the load-bearing gear. If, in addition, the rotor is borne without any play continuously, via the gear stage to the load-bearing gear, the running noises will be greatly reduced.

Using two drive units for two interconnected, single adjusters, it is not necessary to provide any transmission element or any additional stage for spatially displacing same. In addition, the load-bearing gear of each adjuster must only withstand half of the total force as a blocking force which, in addition to the fact that no transmission element is needed, considerably reduces the design effort required for each load-bearing gear in order to meet this requirement.

Other aspects and advantages of the present invention will become apparent from the following.

BRIEF DESCRIPTION OF THE DRAWINGS

The invention is described in detail below with reference to an exemplary embodiment depicted in the drawings, with several motor variants, gear stage types, and the respective modifications thereof. In the drawings:

FIG. 7 is a schematic view of a third type of gear stage, FIG. 8 illustrates a cross section taken along the line VIII-VIII in FIG. 7.

DETAILED DESCRIPTION OF EXEMPLARY EMBODIMENT

Figure 1:
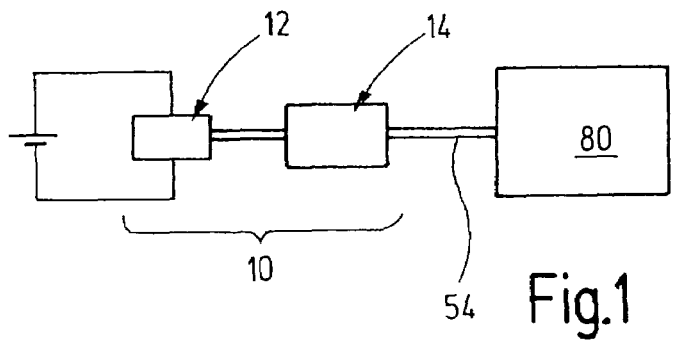
FIG. 1 illustrates a layout of the principle of the exemplary embodiment.
Figure 2A:
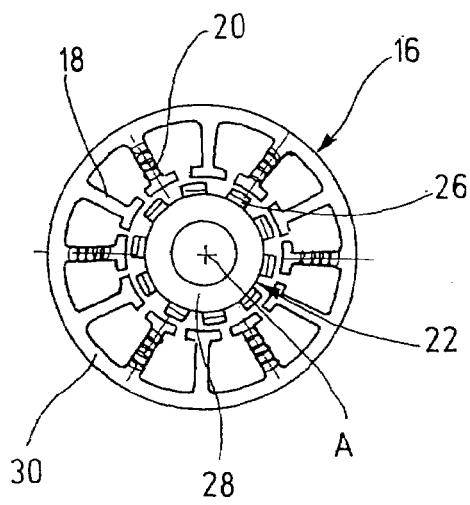
FIG. 2A illustrates a first motor variant.
Figure 2B:
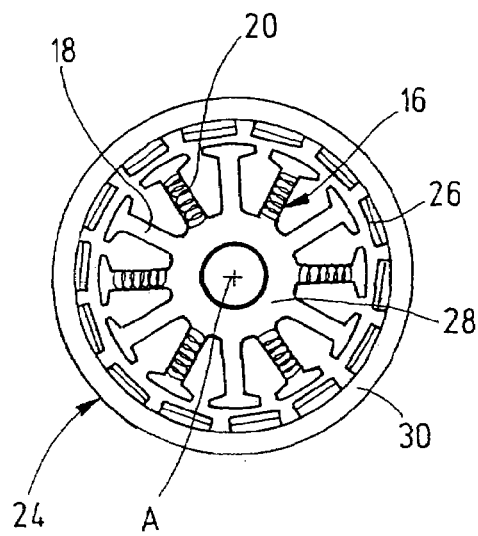
FIG. 2B illustrates a second motor variant.
Figure 2C:
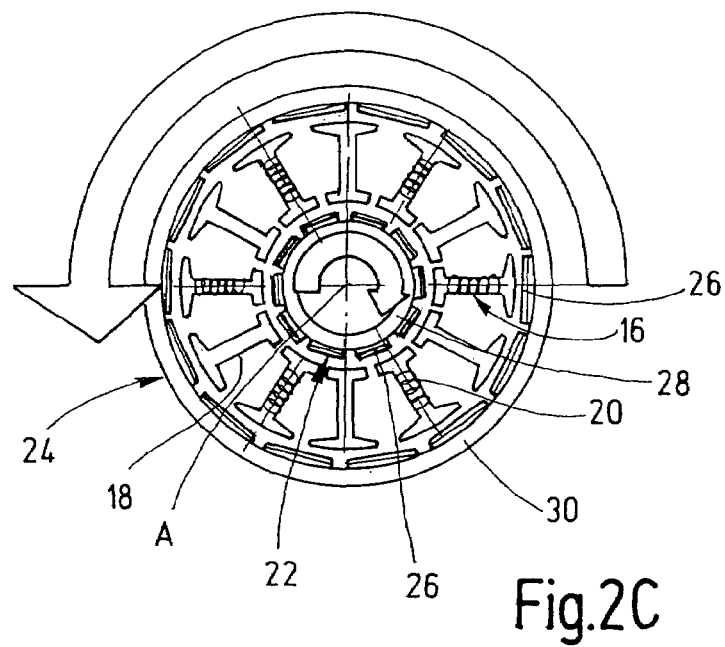
FIG. 2C illustrates a third motor variant.
Figure 3:
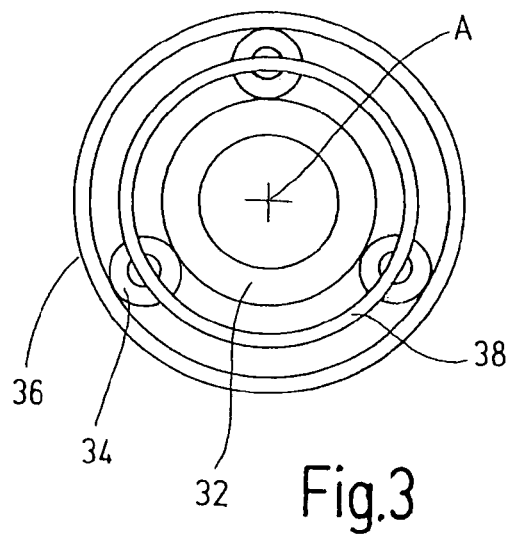
FIG. 3 illustrates a first type of gear stage.
Figure 4:
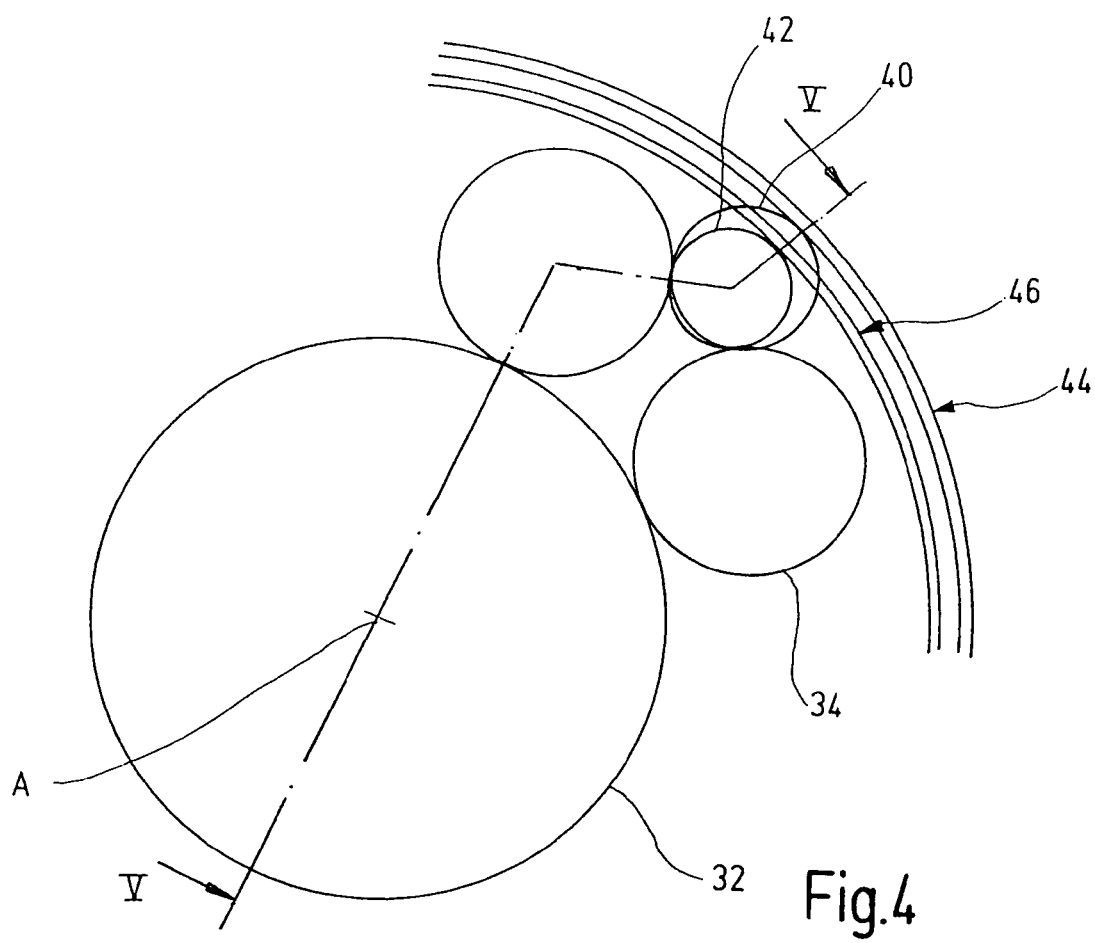
FIG. 4 is a schematic partial view of a second type of gear stage looking in the direction of the arrow IV in FIG. 5.
Figure 5:
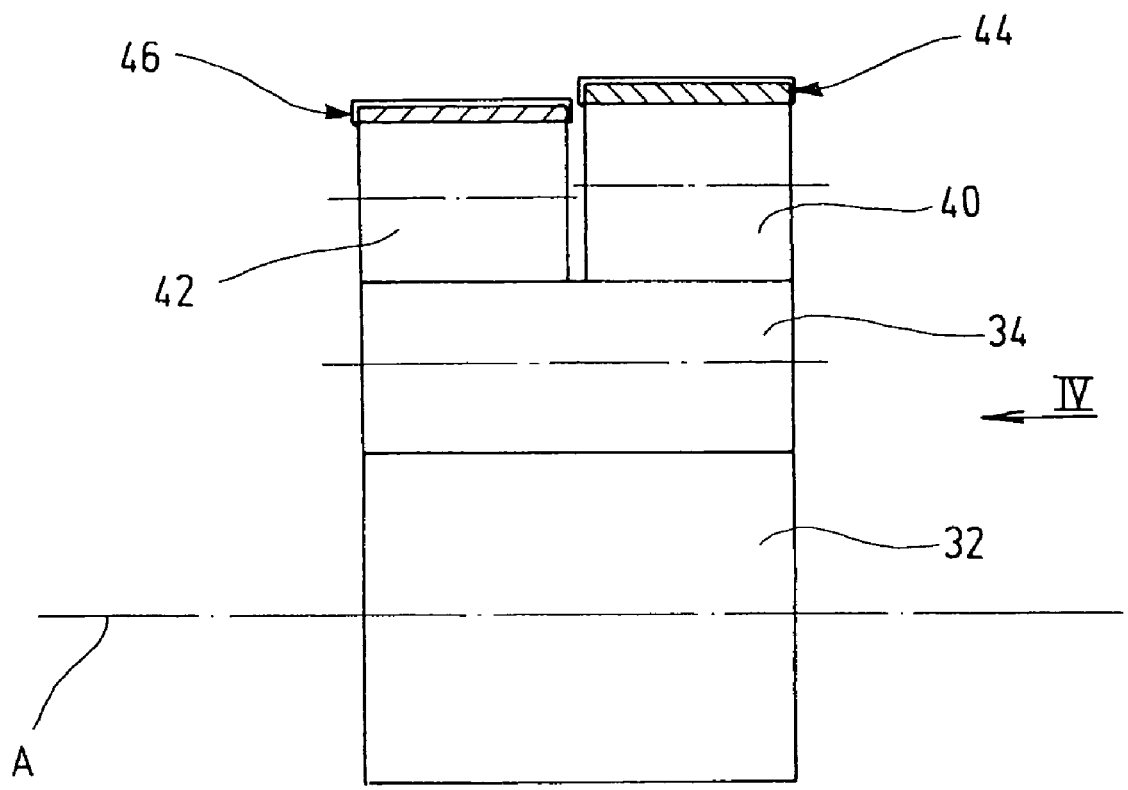
FIG. 5 illustrates a cross section taken along the line V-V in FIG. 4.
Figure 6:
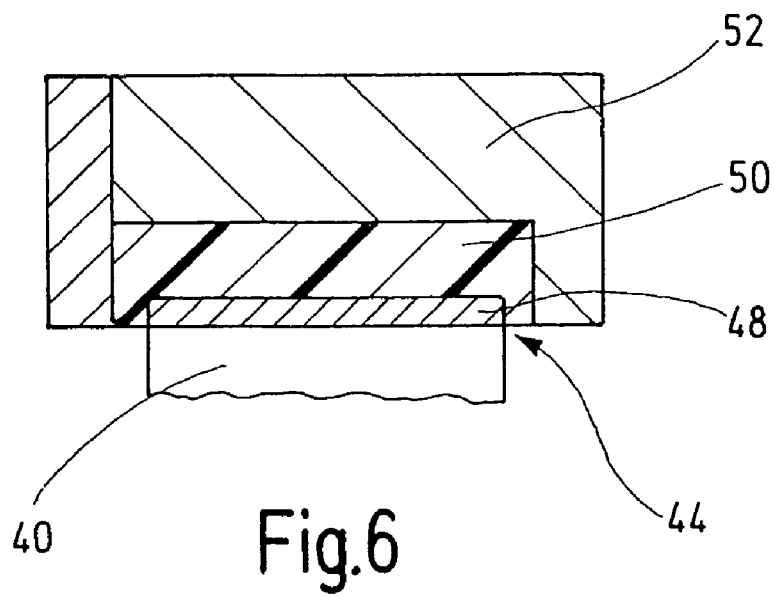
FIG. 6 is an enlarged view of a portion of FIG. 5.
Figure 9:
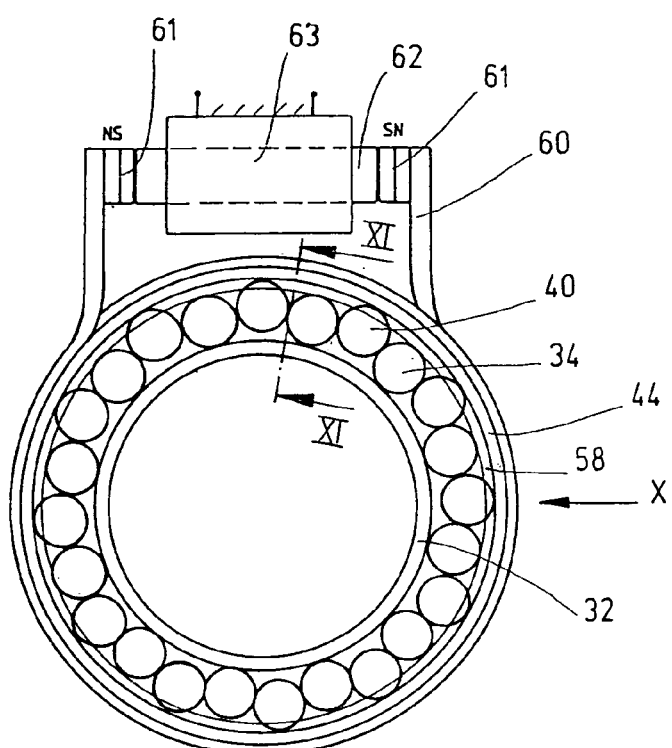
FIG. 9 is a front view of a switchable gear stage.
Figure 10:
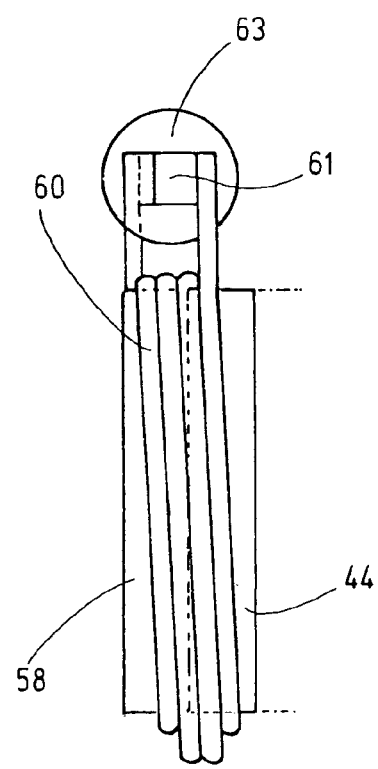
FIG. 10 is a lateral view of the gear stage shown in FIG. 9.
Figure 11:
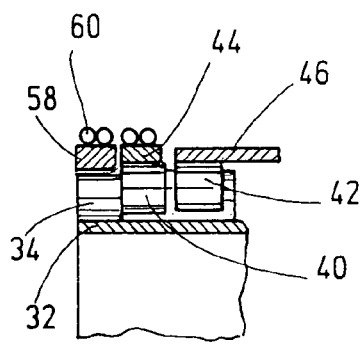
FIG. 11 illustrates a cross section taken along the line XI-XI in FIG. 9.

A drive unit 10 comprises a motor 12 and a gear stage 14. The gear stage 14 is provided on the output side of the motor 12. The motor 12 is an electronically commutated motor having a stator 16 whose stator poles 18 are arranged in a star-shape around an axis A. The axis A running perpendicular to the plane of the drawing in FIGS. 2A to 2C defines the following directional data in cylindrical coordinates. A coil 20 is wrapped around every second one of the altogether twelve stator poles 18. In order to generate a spatially rotating magnetic field, the coils 20 are periodically and at staggered intervals in relation to each other energized by a DC-fed electronic unit (not depicted in detail) that is integrated into the motor 12.

The are three different variations of the motor 12. According to the first variant, the motor 12 is an internal-rotor motor that is provided with an inner rotor 22 arranged radially inside the stator 16. According to the second variant, the motor 12 is an external-rotor motor with an outer rotor 24 arranged radially outside the stator 16. According to the third variant, the motor 12 is a dual-rotor motor ("dual motor") with an inner rotor 22 and an outer rotor 24. In all three variants the inner rotor 22 or the outer rotor 24 rotate about the axis A and carry permanent magnets 26 along the circumferential surface facing the stator 16, with the magnets being alternately poled in the circumferential direction. All the permanent magnets 26 used in the present application exhibit preferably a high degree of permeability, for example by containing metals from the rare earth group. An inner flux ring 28, which in the first and third motor variants is assigned to the inner rotor 22 and in the second motor variant is assigned to stator 16, and an outer flux ring 30, which in the first motor variant is assigned to the stator 16 and in the second and third motor variant is assigned to the outer rotor 24, complete the magnetic flux circuit. The two flux rings 28 and 30 may, if necessary, at the same time act as carriers of the permanent magnets 26. The outer rotor 24 provides a larger amount of torque due to the magnetic forces active over a larger radius (compared with the inner rotor 22). All three motor variants are preferably of hollow-shaft design, i.e. the area around the axis A is left open.

The number of permanent magnets 26 is selected in such a manner that their ratio to the number of stator poles 18 is unequal to 2:3 or 3:2, as a result of which the rotation of the inner rotor 22 or the outer rotor 24 deviates from the rotation of the magnetic field in the stator 16. In the present case, the inner rotor 22 comprises ten permanent magnets 26 and the outer rotor 24 comprises fourteen permanent magnets 26. In keeping with the different number of permanent magnets 26, in the third motor variant (dual motor) the inner rotor 22 and the outer rotor 24 rotate in the present case at different speeds of rotation (5:7) and also in opposite directions of rotation, as indicated by arrows in the drawing.

Instead of having a radial structure, the motor may also have an axial configuration, i.e. the rotors (disc armature) and the stator are arranged axially one behind the other.

The purpose of the gear stage 14 is to reduce the rotational speed delivered by the motor 12 while at the same time transmitting the torque delivered by the motor 12. The gear stage 14 is designed as a differential gear system, various types of which are described below. Each type exists either as a toothed wheel planetary differential gear having flat, toothed planet gears, or also as a preferred configuration in the form of a friction wheel planetary differential gear having cylindrical, smooth planet rollers which—just like the sun wheel—may be hollow or solid. A hollow-shaft design of the gear stage 14, in which the area round the central axis remains free, is preferred.

The first type of gear stage is a single-stage planetary differential gear which will be described first in its friction wheel configuration. The gear stage 14 is aligned with the central axis A of the motor 12. A sun gear 32 is arranged around the axis A and three planet rollers 34, which in turn are enclosed by a hollow gear 36, run along the circumferential surface of the sun gear. The hollow gear 36 provides for radial pretensioning and thus for good rolling of the planet rollers 34 without any slip occurring. An annular planetary carrier 38 bears the planet rollers 34 on axial pins.

The preferred combination of this first type of gear stage is achieved with the third variant, the dual motor, but it may also be achieved with the other motor variants, including brush-commutated motors. The inner rotor 22 is rotationally fixedly connected to the sun gear 32, while the outer rotor 24 is rotationally fixedly connected to the hollow gear 36. The planetary carrier 38 serves as the output of the drive unit 10. The dimensions of the respective diameters are matched to the speeds of rotation, torque forces and directions of rotation of the rotors 22 and 24. The axial lengths of the sun gear 32, planet rollers 34 and hollow gear 36 are preferably selected to be large enough so that the inner rotor 22 and the outer rotor 24 are borne relative to the stator 16 by means of the gear stage 14.

The second type of gear stage is a multi-stage planetary differential gear which again is described in its radially layered friction wheel configuration, but it can also exist as a toothed wheel design. Again, solid and/or hollow components may be used. A sun gear 32 is again arranged around the axis A, and on the circumferential surface of the sun gear is arranged a set of inner planet rollers 34. A first outer planet roller 40 and a second outer planet roller 42, arranged axially one behind the other, are inserted into each gap. Each of the outer planet rollers 40 and 42 is axially about half as long as an inner planet roller 34, and the second outer planet roller 42 is slightly smaller in diameter compared with the first outer planet roller 40, something which is easily achieved, for example, by using cylindrical rollers having metric dimensions, on the one hand, or inch-based dimensions, on the other hand. Instead of the cylindrical shape, another shape may also be used for the roll bodies.

A first outer ring 44 is radially outside of, and encloses the first outer planet rollers 40. A second outer ring 46 is radially outside of, and encloses the second outer planet rollers 42. Each of the outer rings 44, 46 serves as a hollow gear. The outer rings 44, 46 pretension the planet rollers 40, 42 and 34 at all contact points simultaneously towards the sun gear 32. This pretensioning of the two radially layered rows of rollers ensures that all the rollers bear each other and a concentric radially symmetrical slip-free arrangement is obtained, which results in a high degree of efficiency of the gear stage 14. A planetary carrier, and thus an internal bearing of the planet rollers, is not necessary but nor is it excluded. At its end face, the sun gear 32 can be provided with radially outward projecting rims in order to hold the planet rollers in place in the axial direction. This can also be done in the case of the other types of gear stage.

The two outer rings 44 and 46 are in principle constructed in the same way so that in the following only the first outer ring 44 will be described. The first outer ring 44 comprises an elastic metal ring 48 made of steel. The radially inward facing surface of the first outer ring 44 is in contact with the first outer planet rollers 40. The first outer ring 44 has a smaller internal diameter than is needed by the geometrical arrangement of the enclosed rollers in order to apply the pretensioning. On the radially outward-facing side and at both axial faces, the metal ring 48 is located in an elastomer bed 50 of the first outer ring 44. The metal ring 48 and the elastomer bed 50 made of plastic together ensure that very uniform pressure is applied. In addition, the elastomer bed 50 insulates the running noises and reduces moment impacts. The two-part design of the first outer ring 44 described here can also be incorporated in the hollow gear 36 or 36' of the first type of gear stage. A support 52 is provided in order to axially secure the first outer ring 44 with its metal ring 48 and its elastomer bed 50, and this feature may also be incorporated in the two other types of gear stage. For the purposes of assembly, the support 52 is of two-part construction and engages the elastomer bed 50 radially on the outside and with two flanges at the face ends.

For the sake of rotational symmetry, which helps avoiding running noises, the metal ring 48 and the elastomer bed 50 are preferably of continuous design in the circumferential direction, but they may also be slotted or divided, in particular they may have arrow-shaped slots, for example when they are to be connected to the support 52 in a rotationally fixed manner. In order to dissipate heat generated in the gear stage 14, the elastomer bed 50 preferably possesses good thermal conductivity, which is achieved for example by embedding metallic or other heat-conducting fibers or by filling hollow spaces and recesses with a thermally conducting material. A thermally conducting paste may also be provided between the metal ring 48 and the elastomer bed 50.

The small difference in diameter between the first outer planet rollers 40 and the second outer planet rollers 42 and, as a result, between the inner diameter of the first outer ring 44 and the second outer ring 46 causes the two outer rings 44 and 46 to rotate at different speeds. This small difference in the speed of rotation is made use of to achieve a great speed reduction (e.g. 200) in gear stage 14 when it is connected to the motor 12.

This second type of gear stage is preferably combined with the first or second motor variant, but it can also be combined with other motor variants, including brush-commutated motors. The first outer ring 44, more precisely its support 52, is for example attached to the housing, i.e. to the stator 16. The sun gear 32, which acts as the drive wheel, is connected to the inner rotor 22 (or the outer rotor 24 or a planetary carrier 38), while the second outer ring 46 acts as the output 54. In this case, the output shaft, which for example may be a hollow shaft, is attached by means of a bell-shaped end piece to the second outer ring 46, more precisely to the support 52 thereof. In the present case, the second outer ring 46 rotates in the same direction as the sun gear 32. The configuration selected for the second type of gear stage makes it unnecessary to provide a separate bearing for the sun gear 32 and thus for the inner rotor 22 (or the outer rotor 24) and for the second outer ring 46, i.e. for the output 54, but it does not exclude the possibility. However, bearing of the inner rotor 22 (or the outer rotor 24) in the gear stage 14 has the advantage that there is no play, and thus the inner rotor 22 (or the outer rotor 24) run noiselessly.

In a modified design of the second type of gear stage, the (smaller) second outer ring 46 is attached to the housing and the (larger) first outer ring 44 is the output, which results in counter-rotation of the sun gear 32 and the first outer ring 44. By optionally attaching the outer rings 44 and 46 to the housing, which results in a change in the output, for example by means of two pawl systems or a circuit which is described in more detail below, it is possible to reverse the direction of rotation of the output while the direction of rotation of the sun gear 32 remains the same. The design of the electronic system needed for the motor 12 can then be greatly simplified, which also simplifies the manufacture of the motor 12.

The second type of gear stage can be further modified by providing a different number of roller sets. In general, it is possible to provide one or more sun gears arranged axially behind each other, an equal number of appropriately axially arranged inner planet rollers, possibly a set of intermediate planet rollers for synchronization purposes, one or more sets of outer rollers arranged axially behind each other, and an equal number of appropriately axially arranged outer rings. The small difference in rotational speeds is taken off in the manner described between two adjacent gear elements.

Instead of a sun gear plus a set of inner planet rollers, it is also conceivable to use just a sun gear of suitably large diameter which rolls directly on the next outer set of planet rollers, and/or instead of a set of outer planet rollers plus an outer ring it is conceivable to use just an outer ring of suitably small diameter which rolls directly on the next inner set of planet rollers.

The third type of gear stage is again a single-stage planetary differential gear which is again described as a radially layered frictional wheel configuration, although a toothed wheel configuration is also possible. The gear stage 14 is aligned with the central axis A of the motor 12. A sun gear 32 is arranged around the axis A and three planet rollers 34 roll along its circumferential surface. About halfway along their axial length, the unstepped planet rollers 34 are enclosed by an annular first hollow gear 36 that has low elasticity, i.e. is relatively stiff. Along the other half of their axial length the planet rollers 34 are enclosed by a second hollow gear 56. The second hollow gear 56 has a higher degree of elasticity and a smaller inner circumference than the first hollow gear 36. Both factors, together with the second hollow gear 56 being the contact with the planet rollers 34, results in the second hollow gear 56 having a shape that deviates from a circular shape, more specifically the second hollow gear 56 has a slightly triangular shape. This triangular shape of the second hollow gear 56 is slightly exaggerated in the drawings, and it changes dynamically while in operation. The differences in elasticity are attained by selecting suitable materials.

Both hollow gears 36 and 56 provide radial pretensioning with a high pressure force, thereby ensuring good rolling of the planet rollers 34 without any slip, and the sun gear 32 compensates the radial forces. With drive input via the sun gear 32 instead of via a planetary carrier, the ratio of the inner circumferences of the hollow gears does not have to be 200/199 for a gear ratio of 200, but instead a more generous ratio and thus one that is less sensitive to tolerance can be selected. In addition to, or instead of, the sun gear 32, a planetary carrier bearing the planet rollers can be used as the input drive, similar to the design of the first type of gear stage, or a bearing cage locating the planet rollers may be provided. In a modified embodiment, two sun gears of different elasticity arranged axially one behind the other may also be provided in combination with a hollow gear, or other combinations of continuous or split sun gears and hollow gears of different elasticity may be provided. The planet rollers may also be stepped.

In order to transmit the deformation of the second hollow gear 56 to a rigid shaft for the output 54 or alternatively to bear it on the housing, the second hollow gear 56 is mounted in an elastomer bed 50, for example a rubber ring, which encloses it radially on the outside, and this ring is in turn radially arranged within a support 52. The elastomer bed 50 may also be regarded as a further component of the hollow gear 56 which comprises a metal ring. Instead of the elastomer bed 50, elastic spokes for the second hollow gear 56 or an axial or radial power pick-off may be provided, possibly with the interposition of a cup with deformable walls or a perforated disc comprising damper elements. The slightly non-uniform movement of the hollow gear 56 is preferably not or only slightly compensated.

This third type of gear stage is preferably combined with the first or second motor variant, but it may also be combined with other motor variants, including brush-commutated motors. The first hollow gear 36 is, for example, attached to the housing, i.e. to the stator 16. The sun gear 32, which acts as the drive, is connected to the inner rotor 22 (or the outer rotor 24), while the second hollow gear 56 acts as the output 54. In this case, the power-output shaft, which for example may be a hollow shaft, is attached by means of a bell-shaped end piece to the second hollow gear 56, more precisely to the support 52 thereof. The respective diameters must always be in the same orders of magnitude so that further ratios are possible through the choice of diameters. The axial lengths of the sun gear 32, planet rollers 34 and hollow gear 36 are preferably large enough that the inner rotor 22 and the outer rotor 24 can be positioned relative to the stator 16 by means of the gear stage 14. The configuration selected for the third type of gear stage also makes it unnecessary to provide separate bearing of the sun gear 32 and thus of the inner rotor 22 (or of the outer rotor 24) as well as of the second hollow gear 56, i.e. of the output 54, but it does not exclude this possibility.

The gear stage 14 may be designed as a switch gear by means of which it is possible to select between two different directions of rotation of the output 54 while retaining one sole permanent direction of rotation of the motor 12, which is described in more detail in the following on the basis of the second type of gear stage. As explained with the second type of gear stage, a set of inner planet rollers 34 sits on the sun gear 32, and a set of first planet rollers 40 is in turn arranged on top of the planet rollers 34 and is held in place under pretension by a first outer ring 44. Axially offset from the first planet rollers 40 and the first outer ring 44, a set of second planet rollers 42 is held in place under pretension by a second outer ring 46. The second outer ring 46 forms part of the output 54. The axial length of the inner planet rollers 34 is selected such that a third outer ring 58 is arranged axially alongside the first outer ring 44 on the side facing away from the second outer ring 46. The third outer ring 58 is under pretension and directly encircles the inner planet rollers 34. The outer diameters of the first outer ring 44 and of the third outer ring 58 coincide at least approximately.

The middle of a wound spring 60 is attached to the housing; otherwise some of the windings of the spring are wrapped around the first outer ring 44, and the rest of its windings are wrapped around the third outer ring 58. In each case a permanent magnet is arranged as a holding magnet 61 at both free ends of the wound spring 60, and the mutually facing poles of the two holding magnets 61 repel each other. The holding magnets 61 preferably possess high permeability, for example because they contain metals from the rare earth group. A soft iron core 62 is arranged between the two holding magnets 61. A switching coil 63, which can be energized with optional polarity, is wrapped around the soft iron core 62.

With the switching coil 63 in the non-energized state, both holding magnets 61 are in contact with the core 62, which locally completes the magnetic flux circuit. Both outer rings 44 and 58 and thus the gear stage 14 are as a result held in place. When the coils 20 of the stator 16 are energized, the switching coil 63 is also energized. Depending on the direction of the current, one of the two holding magnets 61 continues to be attracted while the other is repulsed. As a result, the latter opens up this side of the wound spring 60, thereby releasing the corresponding outer ring 44 or 58. Due to the small differences in diameter of the outer rings 44 and 58, which normally cause differences in the speeds of rotation, the direction of rotation of the second outer ring 46 and thus of the output 54 is defined according to which outer ring 44 or 58 is blocked, while the direction of rotation of the motor 12 and thus of the sun gear 32 remains constant (unidirectional motor), with the two possible directions of rotation of the output being opposite to each other.

Figure 12:
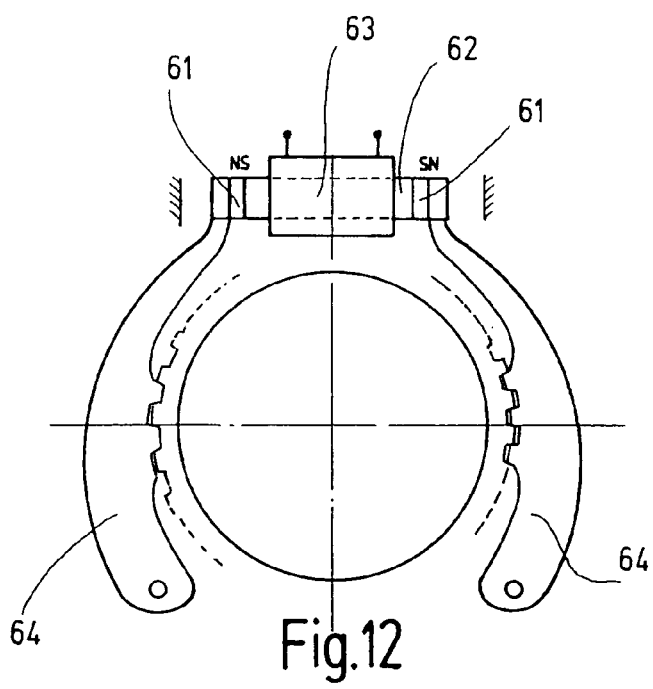
FIG. 12 illustrates a modification of the gear stage shown in FIG. 9.

Apart from the switch gear described above, which has a friction-type locking device, in a modification of the design it is also conceivable to employ a switch gear with a positive-acting locking solution. As shown in FIG. 12, the holding magnets 61 may, for example, be arranged on toothed pawls 64 which respectively switchably lock the toothed outer rings. The function is the same as described above.

The locking device can also be used to block torque forces which are introduced by the output 54 in the idle state. Such blocking action does not have to occur inside the gear stage 14 but may also be applied between the motor 12 and the gear stage 14.

Figure 13A:
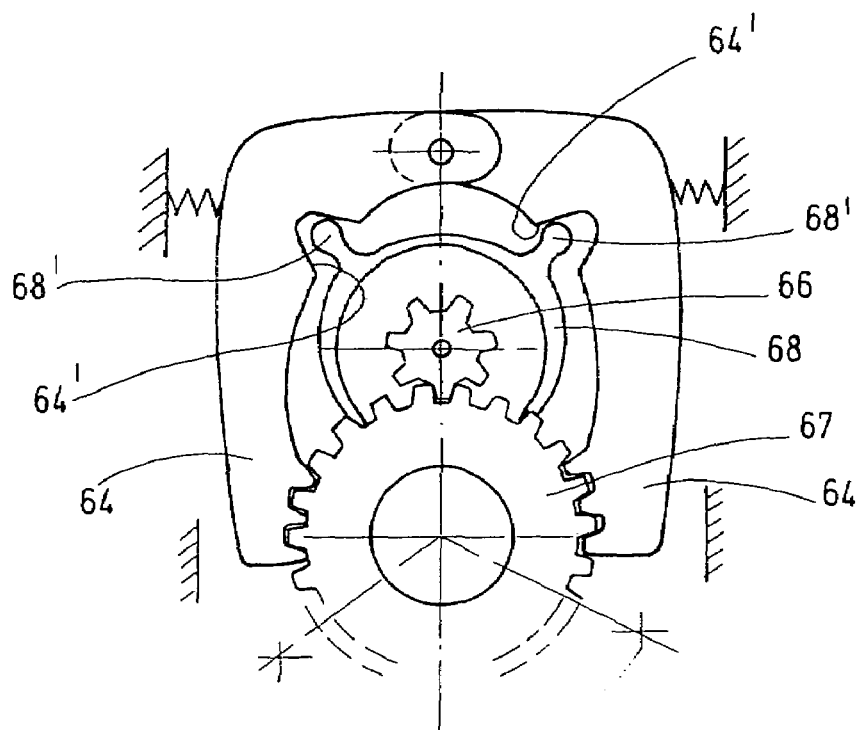
FIG. 13A illustrates a locking device for the motor for blocking torque forces introduced on the output side in the blocking state.
Figure 13B:
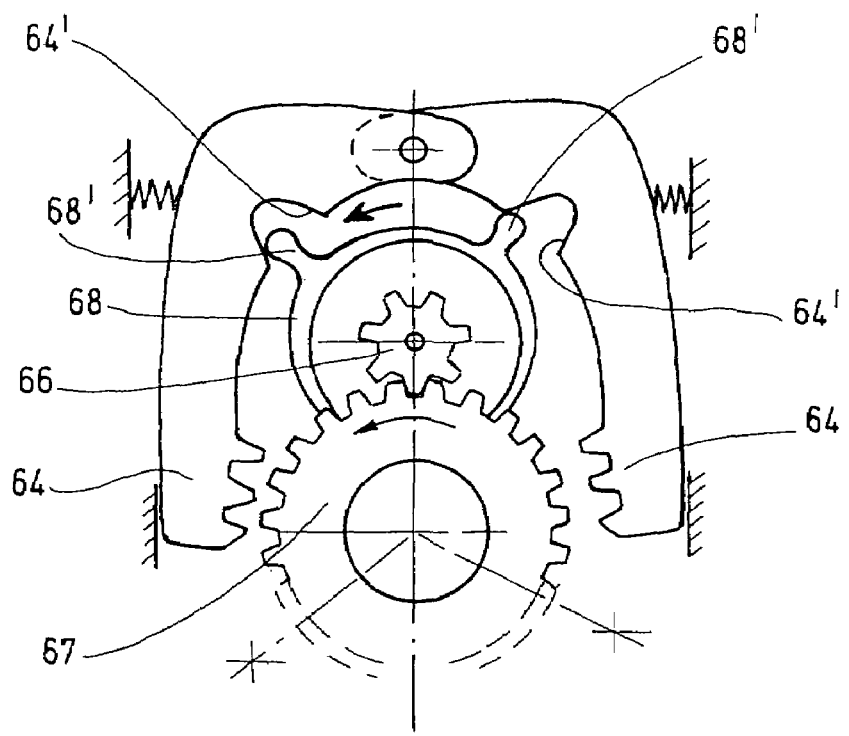
FIG. 13B illustrates the locking device shown in FIG. 13A with the motor starting up.

As shown in FIG. 13A, the output shaft of the motor 12 is, for example, provided on the one hand with a motor pinion 66 which engages in an intermediate gear 67 connected to the sun gear 32 and, on the other hand, it is connected frictionally with a disc cam 68 having two cam projections 68'. In the idle state, two spring-loaded toothed pawls 64 engage at least approximately positively in the intermediate gear 67, blocking the latter in particular against the torque forces introduced on the output side. Once the motor 12 starts to rotate, the disc cam 68 rotates with it and the cam projections 68' come into contact with control contours 64' of the toothed pawls 64, thereby lifting the toothed pawls 64 out of engagement with the intermediate gear 67, as illustrated in FIG. 13B. The intermediate gear 67 can now be driven without any hindrance, wherein the frictional contact with the disc cam 68 is preferably eliminated. In a preferred variant of the embodiment, the disc cam 68 is not borne in frictional contact with a rotating axis but is connected in rotationally fixed manner to the non-rotating part of the motor, and this in turn is rotatably borne through a small angular range relative to the housing. Because of the torque exerted between the motor pinion 66 and the disc cam 68 borne in this manner, the latter now rotates automatically when the motor 12 is switched on and thus automatically causes the toothed pawls to disengage. The type of motor commutation is of no importance for this locking device. The locking action may also occur frictionally.

In certain, special situations, it may be desirable for the drive unit 10 to put out a higher rotational speed and/or a higher torque. In the case where the drive unit 10 is used in a vehicle, such a situation would be a crash. The devices driven by drive unit 10 are then intended to assume as quickly as possible certain settings in order to increase the protection of the vehicle occupants. In this case it is accepted that the drive unit 10 might subsequently be unusable. Another special situation would be the rapid setting of one or more adjusters of a vehicle seat over a large range, for example folding the backrest forward (swing free) combined with a longitudinal adjustment in order to facilitate access to a rear set of seats (easy entry).

A mechanical solution for the rapid adjustment could be achieved using the second and third type of gear stage, configured as a switch gear unit with selectable gear ratios, if the difference in the geometries of the outer rings 44 and 46 or in the elasticities of the hollow gears 36 and 56 is sufficiently large. Using the locking device provided in the switch gear unit, which when alternatingly switched accurately locks either an outer ring 44 or 46 or a hollow gear 36 or 56, it is possible to generate different speeds and thus different gear ratios at the output. If the direction of rotation of the motor 12 remains constant the direction of rotation of the output changes, a state which corresponds to the situation described above for the unidirectional motor. A constant direction of rotation of the output can be generated—apart from by switching the locking device—also by changing the direction of rotation of the motor 12.

If the motor 12 is operated with the coils 20 in a star-connected circuit, it is possible in the special situation to switch the operation to a star-connected system with a central tap in order to reduce the effective resistance and also to increase the performance for a short time. Using a star-connected circuit to energize the motors is also a particularly good solution for a combination involving the third motor variant and a locking device. When the special situation occurs, one of the two rotors in the third motor variant is mechanically blocked by the locking device. The downstream gear stage 14 then acts as a differential gear with a higher gear ratio (less reduction). After the switch is made to the middle tap, the other rotor runs with a higher power uptake due to the lower resistance, and this ultimately produces the desired increase in power at the output 54.

The drive unit 10 provided according to the invention is used in the present case to drive the adjuster 80 in a vehicle, although the drive unit 10 may also be used elsewhere. Generally, the adjuster 80 comprises two components which are movable relative to each other, between which the drive unit 10 operates with its output 54. The low speed of rotation of the output 54 produces a large amount of torque. Means can be provided to convert the rotational movement of the output 54 into linear motion in the adjuster 80. A separate drive unit may also be provided for each adjustment direction of the adjuster 80. Examples of how the adjuster 80 might be used are in the case of vehicle seats a backrest inclination adjuster, especially in the form of a self-locking geared fitting, a seat height adjuster acting between two gear elements of a four-bar mechanism, a seat inclination adjuster pivoting the front edge of a seat cushion, or a longitudinal seat adjuster that moves the vehicle seat on rails in a longitudinal direction.

In several applications, two similar single adjusters 80 act together in order to jointly move a component. For example, as a rule, in vehicle seats the same single adjusters 80 are present on both sides of the seat and, in a known manner, they are coupled and synchronized in pairs by means of a rotatable transmission rod. Using the drive unit 10 according to the invention, which takes up very little installation space, it is possible to provide each single adjuster 80 in a pair with its own drive unit 10. These drive units are synchronized by, for example, the electronic system used for electronic commutation of the motor 12 or—in the case of a vehicle seat—via the stiffness of the structure of the vehicle seat.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A drive unit of an adjuster for a vehicle, the drive unit comprising:
    an electronically commutated motor including at least
        (a) a stator, and
        (b) a rotor configured for rotating in response to the rotor interacting magnetically with the stator; and
    a switchable planetary differential gear, wherein
    the rotor is borne by the switchable planetary differential gear,
    the switchable planetary differential gear is a friction-wheel type of gear stage that includes rollers, and
    each of the rollers is independently selected from the group consisting of solid rollers and hollow rollers,
    the switchable planetary differential gear and the motor are cooperatively associated with one another at least for making use of at least one difference to provide rotation of an output component of the switchable planetary differential gear about an axis,
    the at least one difference is selected from the group consisting of a difference in speed of rotation and a difference in direction of rotation,
    the switchable planetary differential gear is operative at least so that at least two different features of the switchable planetary differential gear can be switchably locked, and
    each of the at least two different features is independently selected from the group consisting of outer rings of the switchable planetary differential gear and sun wheels of the switchable planetary differential gear.

2. The drive unit according to claim 1, wherein gear ratios of the switchable planetary differential gear are selectable by the switchable locking.

3. The drive unit according to claim 1, wherein each of the at least two different features is selected from the group consisting of the outer rings of the switchable planetary differential gear.

4. The drive unit according to claim 1, wherein:
    the switchable planetary differential gear is at least a single-stage differential gear;
    the rollers comprise at least one set of planet rollers; and
    the differential gear includes at least
        a sun wheel, and
        an outer ring.

5. The drive unit according to one claim 4, wherein the outer ring comprises an elastic metal ring and an elastomer bed, wherein the elastomer bed is in receipt of the elastic metal ring.

6. The drive unit according to claim 4, wherein:
    the sun wheel is a first sun wheel;
    the switchable planetary differential gear includes a second sun wheel; and
    with respect to the axis, the first sun wheel and the second sun wheel are axially adjacently arranged with respect to one another.

7. The drive unit according to claim 4, wherein:
    the outer ring is a first outer ring;
    the switchable planetary differential gear includes a second outer ring; and
    with respect to the axis, the first outer ring and the second outer ring are axially adjacently arranged with respect to one another.

8. The drive unit according to claim 4, wherein:
    the sun wheel is a first sun wheel;
    the switchable planetary differential gear includes a second sun wheel;
    there is at least one difference between the first sun wheel and the second sun wheel; and
    the at least one difference between the first sun wheel and the second sun wheel is selected from the group consisting of the first sun wheel and the second sun wheel having different outer diameters, and the first sun wheel and the second sun wheel having different elasticities.

9. The drive unit according to claim 4, wherein:
    the outer ring is a first outer ring;
    the switchable planetary differential gear includes a second outer ring;
    there is at least one difference between the first outer ring and the second outer ring, and
    the at least one difference between the first outer ring and the second outer ring is selected from the group consisting of the first outer ring and the second outer ring having different inner diameters, and the first outer ring and the second outer ring having different elasticities.

10. The drive unit according to one claim 4, wherein the outer ring is at least partially embedded in an elastomer bed.

11. The drive unit according to claim 4, wherein the planet rollers are unstepped.

12. The drive unit according to claim 4, wherein:
the rotor is a first rotor;
the motor further includes a second rotor configured for rotating in response to the second rotor interacting magnetically with the stator;
the sun wheel is rigidly connected to the first rotor for rotating with the first rotor; and
the outer ring is rigidly connected to the second rotor for rotating with the second rotor.

13. The drive unit according to claim 12, wherein the output component comprises a planetary carrier of the switchable planetary differential gear, and the planetary carrier carries the set of planet rollers.

14. The drive unit according to claim 12, wherein the outer ring is a planetary carrier that carries the set of planet rollers.

15. A drive unit of an adjuster for a vehicle, the drive unit comprising:
an electronically commutated motor including at least
(a) a stator, and
(b) a rotor configured for rotating in response to the rotor interacting magnetically with the stator; and
a differential gear that is a friction-wheel type of gear stage that includes rollers, wherein
each of the rollers is independently selected from the group consisting of solid rollers and hollow rollers,
the rollers comprise at least one set of planet rollers,
the rotor is borne by the differential gear,
the differential gear is at least a single-stage differential gear,
the differential gear includes at least a sun wheel and a first outer ring,
the first outer ring is operatively connected to the stator so that any rotation of the first outer ring relative to the stator is restricted,
the differential gear and the motor are cooperatively associated with one another at least for making use of at least one difference to provide rotation of an output component of the differential gear about an axis,
the at least one difference is selected from the group consisting of a difference in speed of rotation and a difference in direction of rotation,
the output component of the differential gear is a second outer ring,
there is at least one difference between the first outer ring and the second outer ring,
the at least one difference between the first outer ring and the second outer ring is selected from the group consisting of the first outer ring and the second outer ring having different inner diameters, and the first outer ring and the second outer ring having different elasticities, and
with respect to the axis, the first outer ring and the second outer ring are axially adjacently arranged with respect to one another.

16. The drive unit according to claim 15, wherein the planetary differential gear is a switchable planetary differential gear that is operative at least so that:
at least two different features of the switchable planetary differential gear can be switchably locked, and
each of the at least two different features is independently selected from the group consisting of outer rings of the switchable planetary differential gear and sun wheels of the switchable planetary differential gear.

17. A drive unit of an adjuster for a vehicle, the drive unit comprising:
a electronically commutated motor including at least
(a) a stator, and
(b) a rotor configured for rotating in response to the rotor interacting magnetically with the stator; and
a switchable planetary differential gear, wherein the switchable planetary differential gear is a friction-wheel type of gear stage that includes at least
(a) rollers, and each of the rollers is independently selected from the group consisting of solid rollers and hollow rollers,
(b) a sun wheel rigidly connected to the rotor for rotating with the rotor,
(c) a first outer ring, wherein the first outer ring is locked during a first mode of operation of the switchable planetary differential gear so that any rotation of first outer ring relative to the stator is restricted during the first mode of operation, and wherein the first outer ring is unlocked during a second mode of operation of the switchable planetary differential gear so that the first outer ring rotates relative to the stator during the second mode of operation,
(d) a second outer ring, wherein the second outer ring is locked during the second mode of operation so that any rotation of the second outer ring relative to the stator is restricted during the second mode of operation, and wherein the second outer ring is unlocked during the first mode of operation so that the second outer ring rotates relative to the stator during the first mode of operation, and
(e) a third outer ring, the third outer ring rotating about an axis in response to rotation of the sun wheel during the first mode of operation, the third outer ring rotating about the axis in response to rotation of the sun wheel during the second mode of operation, and the rotating of the third outer ring about the axis in response to rotation of the sun wheel during the first mode of operation being different from the rotating of the third outer ring about the axis in response to rotation of the sun wheel during the second mode of operation.

18. The drive unit according to claim 17, wherein the rotor is borne by the switchable planetary differential gear.

19. The drive unit according to claim 17, wherein:
the rotating of the third outer ring about the axis in response to rotation of the sun wheel during the first mode of operation comprises the third outer ring rotating at a first ratio with respect to the rotor;
the rotating of the third outer ring about the axis in response to rotation of the sun wheel during the second mode of operation comprises the third outer ring rotating at a second ratio with respect to the rotor; and
the first ratio is different from the second ratio.

20. The drive unit according to claim 17, wherein:
the rotating of the third outer ring about the axis in response to rotation of the sun wheel during the first mode of operation comprises the third outer ring rotating in a first direction;
the rotating of the third outer ring about the axis in response to rotation of the sun wheel during the second mode of operation comprises the third outer ring rotating in a second direction; and
the first direction is opposite from the second direction.

21. An apparatus for adjusting a component of a vehicle, the apparatus comprising:
- an electronically commutated motor including at least
  - (a) a stator, and
  - (b) a rotor configured for rotating in response to the rotor interacting magnetically with the stator;
- a switchable planetary differential gear including at least
  - (a) a first component selected from the group consisting of a sun wheel and a sun gear, wherein the first component is rigidly connected to the rotor for rotating with the rotor,
  - (b) a second component selected from the group consisting of a first outer ring and a first hollow gear, wherein the second component is locked during a first mode of operation of the switchable planetary differential gear so that any rotation of the second component relative to the stator is restricted during the first mode of operation, and wherein the second component is unlocked during a second mode of operation of the switchable planetary differential gear so that the second component rotates relative to the stator during the second mode of operation,
  - (c) a third component selected from the group consisting of a second outer ring and a second hollow gear, wherein the third component is locked during the second mode of operation so that any rotation of the third component relative to the stator is restricted during the second mode of operation, and wherein the third component is unlocked during the first mode of operation so that the third component rotates relative to the stator during the first mode of operation, and
  - (d) a fourth component selected from the group consisting of a third outer ring and a third hollow gear, the fourth component rotating about an axis in response to rotation of the first component during the first mode of operation, the fourth component rotating about the axis in response to rotation of the first component during the second mode of operation, and the rotating of the fourth component about the axis in response to rotation of the first component during the first mode of operation being different from the rotating of the fourth component about the axis in response to rotation of the first component during the second mode of operation; and
- an adjuster operatively connected to the fourth component for being driven by the fourth component.

22. The apparatus according to claim 21, wherein:
the rotating of the fourth component about the axis in response to rotation of the first component during the first mode of operation comprises the fourth component rotating in a first direction;
the rotating of the fourth component about the axis in response to rotation of the first component during the second mode of operation comprises the fourth component rotating in a second direction during the second mode of operation; and the first direction is opposite from the second direction.

23. The drive unit according to claim 21, wherein:
the switchable planetary differential gear is a switchable toothed wheel planetary differential gear;
the first component is the sun gear;
the sun gear is toothed;
the second component is the first hollow gear;
the first hollow gear is toothed;
the third component is the second hollow gear;
the second hollow gear is toothed;
the fourth component is the third hollow gear; and
the third hollow gear is toothed.

24. A drive unit of an adjuster for a vehicle, the drive unit comprising:
- an electronically commutated motor including at least
  - (a) a stator, and
  - (b) a rotor configured for rotating in response to the rotor interacting magnetically with the stator; and
- a differential gear that is a friction-wheel type of gear stage that includes rollers, wherein
- each of the rollers is independently selected from the group consisting of solid rollers and hollow rollers,
- the rollers comprise at least one set of planet rollers,
- the rotor is borne by the differential gear,
- the differential gear is at least a single-stage differential gear,
- the differential gear includes at least a sun wheel and a first outer ring,
- the sun wheel is rigidly connected to the rotor,
- the first outer ring is operatively connected to the stator so that any rotation of the first outer ring relative to the stator is restricted,
- the differential gear and the motor are cooperatively associated with one another at least for making use of at least one difference to provide rotation of an output component of the differential gear about an axis,
- the output component of the differential gear is a second outer ring, and
- the at least one difference is selected from the group consisting of a difference in speed of rotation and a difference in direction of rotation.

* * * * *